US008377594B2

(12) United States Patent
Chang et al.

(10) Patent No.: US 8,377,594 B2
(45) Date of Patent: Feb. 19, 2013

(54) CATHODE ACTIVE MATERIAL FOR LITHIUM SECONDARY BATTERY

(75) Inventors: Sung kyun Chang, Daejeon (KR); Hong-Kyu Park, Daejeon (KR); Sinyoung Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/837,897

(22) Filed: Jul. 16, 2010

(65) Prior Publication Data

US 2011/0065003 A1    Mar. 17, 2011

Related U.S. Application Data (63) Continuation of application No. PCT/KR2010/000065, filed on Jan. 6, 2010.

(30) Foreign Application Priority Data

Jan. 6, 2009   (KR) .................. 10-2009-0000714

(51) Int. Cl.
*H01M 4/50* (2010.01)

(52) U.S. Cl. ....................................... 429/223; 429/224

(58) Field of Classification Search .................. 429/223, 429/224, 231.3
See application file for complete search history.

(56) References Cited

U.S. PATENT DOCUMENTS

| 6,174,623 B1 * | 1/2001 | Shackle .................. 429/218.1 |
| 6,416,902 B1 * | 7/2002 | Miyasaka .................. 429/223 |
| 2002/0034583 A1 | 3/2002 | Jung |
| 2008/0038636 A1 | 2/2008 | Suguro et al. |

FOREIGN PATENT DOCUMENTS

| JP | 2005-310744 A | 11/2005 |
| KR | 10-2006-0084886 A | 7/2006 |
| WO | WO 2006/027925 A2 | 3/2006 |

\* cited by examiner

*Primary Examiner* — Jennifer K Michener
*Assistant Examiner* — Monique Wills
(74) *Attorney, Agent, or Firm* — Birch, Stewart, Kolasch & Birch, LLP (57) ABSTRACT

Disclosed herein is a cathode active material based on lithium nickel-manganese-cobalt oxide represented by Formula 1, wherein the lithium nickel-manganese-cobalt oxide has a nickel content of at least 40% among overall transition metals and is coated with a conductive polymer at a surface thereof. A lithium secondary battery having the disclosed cathode active material has advantages of not deteriorating electrical conductivity while enhancing high temperature stability, so as to efficiently provide high charge capacity.

7 Claims, 4 Drawing Sheets

CATHODE ACTIVE MATERIAL FOR LITHIUM SECONDARY BATTERY

CROSS REFERENCE TO RELATED APPLICATIONS

This application is a Continuation of PCT International Application No. PCT/KR2010/000065 filed on Jan. 6, 2010, which claims the benefit of patent application No. 10-2009-0000714 filed in Republic of Korea, on Jan. 6, 2009. The entire contents of all of the above applications is hereby incorporated by reference into the present application.

TECHNICAL FIELD

The present invention relates to a cathode active material for lithium secondary batteries and, more particularly, to a cathode active material based on lithium nickel-manganese-cobalt oxide represented by Formula 1, wherein the lithium nickel-manganese-cobalt oxide has a nickel content of at least 40% among overall transition metals and is coated with a conductive polymer at a surface thereof.

BACKGROUND ART

With technological advancement and demand for mobile instruments, demand for secondary batteries as an energy source is rapidly increasing. Among such secondary batteries, a lithium secondary battery having high energy density and working potential, a long life cycle, and reduced self-discharge is widely used in the related art.

As to cathode active materials for lithium secondary batteries, lithium containing cobalt oxide ($LiCoO_2$) is widely used. Additionally, lithium containing manganese oxides such as $LiMnO_2$ with a lamellar crystal structure, $LiMn_2O_4$ with a spinel crystal structure, etc., and lithium containing nickel oxide ($LiNiO_2$) have also been proposed.

Among such cathode active materials, although $LiCoO_2$ with excellent physical properties such as cycle properties is widely used, this material encounters disadvantages including, for example, low safety, high cost due to scarcity of cobalt as a natural resource, limitation in large-scale use as a power source in electric vehicle applications, and the like.

Lithium manganese oxides such as $LiMnO_2$, $LiMn_2O_4$, etc., comprise manganese, which is abundant and environmentally beneficial so as to replace $LiCoO_2$, thus attracting considerable attention. However, such lithium manganese oxide has drawbacks such as a low charge capacity and poor cycle properties.

Meanwhile, lithium nickel based oxide such as $LiNiO_2$ has economic merits, compared to the cobalt oxide and, when charged at 4.3V, exhibits high discharge capacity. A reverse capacity of the doped $LiNiO_2$ is about 200 mAh/g which is more than that of $LiCoO_2$ (about 165 mAh/g). Accordingly, even though average discharge potential and volumetric density are somewhat small, a commercially available battery containing a cathode active material shows improved energy density. Under such circumstances, in order to develop a high capacity battery, studies and investigations into nickel based cathode active materials are actively being conducted. However, practical application of $LiNiO_2$ cathode active materials is substantially restricted owing to the following problems First, $LiNiO_2$ oxide exhibits rapid phase transition in a crystal structure due to change of volume involved in a charge-discharge cycle, in turn causing particle fracture and generating pores in a grain boundary. Therefore, absorption and discharge of lithium ions are prevented and polarization resistance is increased, thus deteriorating charge-discharge performance. In order to solve these problems, according to a conventional process, Li source is excessively used and reacts in an oxygen atmosphere to produce $LiNiO_2$ oxide. The produced cathode active material has drawbacks in that a structure is expanded and unstable due to atomic repulsion of oxygen atoms during charge of a battery and cycle properties are seriously deteriorated by repeated charge-discharge.

Second, $LiNiO_2$ encounters a problem of excessive gas generation during storage or charge-discharge cycle. This is because heat treatment is performed while excessively adding Li source to form an excellent crystal structure during production of $LiNiO_2$, and therefore, a water-soluble base such as $Li_2CO_3$, LiOH, etc. as a reaction residue remains between primary particles and is degraded or reacts with an electrolyte, in turn generating $CO_2$ gas during charge. Furthermore, since a $LiNiO_2$ particle substantially has a secondary particle structure formed by aggregation of primary particles, an area in contact with the electrolyte is increased and the foregoing problem becomes more serious, thus causing swelling of the battery and decreasing high temperature stability.

Third, when $LiNiO_2$ is exposed to air and/or moisture, chemical-resistance is drastically decreased at a surface of the oxide and, due to high pH, an NMP-PVDF slurry begins to be polymerized, in turn causing gellation thereof. The foregoing characteristics may cause serious processing problems in the manufacture of batteries.

Fourth, high quality $LiNiO_2$ cannot be prepared by simple solid-phase reaction, unlike the $LiCoO_2$ production method. Any $LiNiMO_2$ cathode active material comprising Co as a necessary dopant, and other dopants such as Mn, Al, etc. is substantially produced by reacting a lithium material such as $LiOH.H_2O$ with a composite transition metal hydroxide under an oxygen atmosphere or a synthetic gas atmosphere (that is, a $CO_2$-free atmosphere), thus requiring high production costs. If any additional process such as washing or coating is conducted in order to remove impurities during production of $LiNiO_2$, production costs are duly increased. Accordingly, conventional technologies have focused in general on improvement of the $LiNiO_2$ production process as well as characteristics of $LiNiO_2$ cathode active material.

A lithium transition metal oxide wherein nickel is partially substituted with other transition metals such as manganese, cobalt, etc. has been proposed. This oxide is a metal-substituted nickel based lithium transition metal oxide with excellent cycle properties and capacity. However, in the case of using the oxide for a long time, cycle properties are drastically deteriorated and other problems such as swelling caused by gas generation in a battery, reduced chemical stability, and so forth, were not sufficiently overcome.

The cause of the foregoing facts is believed to be that: the nickel based lithium transition metal oxide is in a secondary particle form obtained by aggregation of small primary particles; therefore, lithium ions are transported toward a surface of an active material and react with moisture or $CO_2$ in the air to generate impurities such as $Li_2CO_3$, LiOH, etc.; impurities generated by residues remained after production of nickel based lithium transition metal oxide may decrease cell capacity; or the impurities are decomposed inside the battery to generate gas, in turn causing swelling of the battery.

Accordingly, there is still a requirement for development of novel techniques to solve high temperature stability problems due to impurities while utilizing a lithium nickel based cathode active material suitable for increasing capacity of a battery.

DISCLOSURE

Technical Problem

Therefore, the present invention is directed to solving conventional problems described above and to overcoming technical restrictions in related arts.

As a result of extensive studies and a number of experiments executed by the present inventors, it was found that a cathode active material prepared by applying a conductive polymer to a surface of a lithium nickel-manganese-cobalt oxide may exhibit improved high temperature stability without decrease in electrical conductivity and ionic conductivity, thus embodying excellent overall physical properties and high capacity of the cathode active material. Thereby, the present invention was successfully completed.

Technical Solution

Accordingly, the present invention provides a cathode active material including a lithium nickel-manganese-cobalt oxide represented by Formula 1, wherein the lithium nickel-manganese-cobalt oxide has a nickel content of at least 40% among overall transition metals and is coated with a conductive polymer at a surface thereof.

$$Li_xM_yO_2 \quad (1)$$

wherein M is $Ni_{1-a-b}Mn_aCo_b$ ($0.05 \leq a \leq 0.4$, $0.1 \leq b \leq 0.4$, $0.4 \leq (1-a-b) \leq 0.9$), x+y is about 2 and $0.95 \leq x \leq 1.15$.

The cathode active material of the present invention prepared by applying a conductive polymer to a surface of the lithium nickel-manganese-cobalt oxide has advantages of not deteriorating electrical conductivity while maintaining high temperature safety, so as to efficiently provide high capacity based on high Ni content of the lithium nickel-manganese-cobalt oxide.

As to the cathode active material based on a lithium transition metal oxide, when an unstable surface of the material is exposed to an electrolyte and is subjected to internal and/or external impact, oxygen is discharged in turn causing rapid exothermic reaction. Such exothermic reaction may be accelerated by an electrolyte, an electrolyte salt, etc. other than the cathode active material.

As a result of various experiments conducted by the present inventors, it was found that if a conductive polymer is applied to a surface of a cathode active material based on lithium nickel-manganese-cobalt oxide, a stable interface is formed between an electrolyte and the cathode active material so that reactivity of the cathode active material with an electrolyte is considerably decreased, thus inhibiting ignition and/or explosion of a battery and improving safety of the battery. Furthermore, it was found that, since decrease in ionic conductivity is minimized, electrical conductivity may not be reduced.

Accordingly, a secondary battery containing the foregoing material may have high temperature stability and high capacity without deterioration in overall physical properties such as reduction of electrical conductivity. Hereinafter, the present invention will be described in detail.

As to a cathode active material of the present invention, lithium nickel-manganese-cobalt oxide represented by Formula 1 has an Ni content of at least 40% which is relatively higher than other transition metals. Since a fractional ratio of divalent nickel is relatively high, an amount of charge transporting lithium ions is increased, in turn embodying high capacity.

Constitutional composition of the foregoing lithium nickel-manganese-cobalt oxide must satisfy a specific condition defined by Formula 1.

That is, lithium (Li) content 'x' ranges from 0.95 to 1.15 and, if Li content exceeds 1.5, safety may be decreased during cycling due to high voltage (U=4.35V) at a particular temperature of 60° C. In contrast, if x<0.95, rate properties and reverse capacity are reduced.

Alternatively, Ni content (1-a-b) ranges from 0.4 to 0.9, which is relatively higher than those of manganese and cobalt. If Ni content is less than 0.4, the cathode active material cannot have high capacity. On the contrary, when the nickel content is above 0.9, safety is drastically decreased.

Cobalt content 'b' ranges from 0.1 to 0.4. If b>0.4, the cobalt content is excessively high, raw material costs are generally increased while reverse capacity is slightly reduced. On the other hand, if b<0.1, that is, the cobalt content is too low, it is difficult to simultaneously achieve desirable rate properties and high powder density of a battery. x+y preferably ranges from 1.95 to 2.15.

With respect to lithium nickel-manganese-cobalt oxide with high Ni content, as a content of $Ni^{2+}$ ions is increased during calcination, desorption of oxygen becomes serious at a high temperature. As a result, several problems, namely, decrease in stability of a crystal structure, widening of specific surface area, increased impurity content, in turn increasing reactivity of the foregoing oxide with an electrolyte, and reduced high temperature stability, etc. have been encountered.

Accordingly, the present invention provides an improved cathode active material represented by Formula 1, which includes a conductive polymer applied to a surface of the cathode active material so as to minimize reactivity of the cathode active material with an electrolyte, thereby enhancing high temperature stability.

As to application of non-conductive oxide to a surface of the cathode active material to improve high temperature stability, a small amount of application may not substantially influence safety. In contrast, massive application thereof may considerably influence an ion path, thus deteriorating electrochemical performance. Also, because of electrically non-conductive material, an electric path may be cut off, in turn deteriorating performance of a battery.

On the contrary, the conductive polymer of the present invention may have ionic conductivity sufficient not to decrease mobility of ions and electrons, thus not obstructing conductivity.

In a preferred embodiment, the lithium nickel-manganese-cobalt oxide represented by Formula 1 may have an average particle diameter (D50) of 3 to 20 μm. Also, this oxide preferably has an agglomerated particle structure, that is, may comprise aggregated microfine powder with internal pores. In this regard, such microfine powder, that is, a primary particle, may have an average particle diameter of 0.01 to 8 μm while the agglomerated particle, that is, a secondary particle, may have an average particle diameter of 3 to 20 μm.

If the particle diameter of the primary particle is too large, specific surface area is reduced while strength is increased. However, due to cation mixing, cell performance such as rate properties may be deteriorated. Furthermore, if the particle diameter of the secondary particle is too small, an amount of a binder is increased. On the other hand, if the particle diameter of the secondary particle is too large, tap density is reduced.

So long as a conductive polymer has conductivity, this polymer is not particularly limited. However, in order to prevent removal of the conductive polymer during fabrication of an electrode and/or to inhibit elution of the conductive polymer into an electrolyte or degradation of the same when the conductive polymer is contained in a battery, the polymer is preferably inactivated by the electrolyte or an organic solvent.

Such conductive polymer may be at least one selected from a group consisting of polyacetylene, polyphenylene, polyaniline, polythiophene, polyphenylene-vinylene, polyaminopyridine and polypyrrol or a combination of two or more thereof, although not duly restricted thereto.

The above conductive polymer may have a melting point of 80 to 300° C. The conductive polymer having such melting point is fused after when an internal temperature of a battery exceeds 80° C., then, scorched and stuck on a surface of the active material or flows into a gap of the cathode active material, thus reducing mobility of ions and electrons. Therefore, by increasing internal resistance of a battery, progress of electrochemical reaction may be prevented and, therefore, inhibit ignition of the battery.

Furthermore, coating thickness of the conductive polymer depends on various factors such as types of organic solvent, an addition amount of conductive polymer, an addition amount of lithium nickel-manganese-cobalt oxide, agitation speed, velocity, etc., and therefore is not particularly limited. The coating thickness of the conductive polymer may preferably range from 0.1 to 10 µm.

If a coating amount of the conductive polymer is too small, coating effects are not expected. On the contrary, when the coating amount is too large, cell performance may be deteriorated. Therefore, the coating amount man range from 0.5 to 10% by weight relative to a total weight of the active material.

The present invention also provides a lithium secondary battery containing the cathode active material described above. The lithium secondary battery may comprise, for example, a cathode, an anode, a separator and a non-aqueous electrolyte containing lithium salt.

The cathode is fabricated by, for example, applying a mixture of the cathode active material, a conductive material and a binder to a cathode collector and drying the coated collector. Optionally, a filler may be added to the mixture. The anode is fabricated by applying an anode active material to an anode collector and drying the coated collector and, if necessary, may further contain the foregoing ingredients.

The anode active material may include, for example: carbon and graphite materials such as natural graphite, artificial graphite, expandable graphite, carbon fiber, hard carbon, carbon black, carbon nanotubes, fullerene, activated carbon, etc.; metals alloyable with lithium such as Al, Si, Sn, Ag, Bi, Mg, Zn, In, Ge, Pb, Pd, Pt, Ti, etc. and compounds containing the same; composites of metals and compounds thereof with carbon and graphite materials; lithium containing nitrides, and so forth. Among these, carbon based active materials, silicon based active materials, tin based active materials, and/or silicon-carbon based active materials are more preferable and may be used alone or in combination of two or more thereof.

The separator is interposed between the cathode and the anode and consists of a thin insulation film having high ion permeability and excellent mechanical strength. A diameter of each pore in the separator generally ranges from 0.01 to 10 µm and a thickness thereof generally ranges from 5 to 300 µm. Such separator may be fabricated using a sheet or non-woven fabric made of, for example, an olefin polymer such as polypropylene having chemical resistance and hydrophobicity, glass fiber or polyethylene. When a solid electrolyte such as a polymer electrolyte is used, this electrolyte may also serve as the separator.

The binder may include, for example: polyvinylidene fluoride; polyvinyl alcohol; carboxymethyl cellulose (CMC); starch; hydroxypropyl cellulose; regenerated cellulose; polyvinyl pyrrolidone; tetrafluoroethylene; polyethylene; polypropylene; ethylene-propylene-diene terpolymer (EPDM); sulfonated EPDM; styrene-butylene rubber; fluorine rubber; different copolymers; high saponification polyvinyl alcohol, and the like.

Another example of the separator may be an organic/inorganic composite porous separator having an active film, characterized in that at least one region selected from a polyolefin based separator substrate, a surface of the substrate and a part of a porous region in the active film is coated with a mixture of inorganic particles and a binder polymer. Optionally, the inorganic particles may be applied to an electrode side.

Such inorganic particle may include, for example, an inorganic particle with a dielectric constant of 5 or more, an inorganic particle exhibiting piezo-electricity, an inorganic particle with lithium ion transfer ability, and the like.

The conductive material is used to improve conductivity of the electrode active material and may be added in an amount of 1 to 30 wt. % relative to a total weight of an electrode mixture. The conductive material is not particularly restricted so long as it exhibits conductivity while not causing chemical change of a battery. For example, the conductive material may comprise: graphite such as natural graphite or artificial graphite; carbon black such as carbon black, acetylene black, ketchen black, channel black, furnace black, lamp black, summer black, etc.; a conductive fiber such as carbon derivatives including carbon nanotubes or fullerenes, carbon fiber, metal fiber, etc.; metal powder such as carbon fluoride, aluminum or nickel powder; a conductive whisker such as zinc oxide, potassium titanate, etc.; conductive metal oxide such as titanium oxide; a conductive material such as polyphenylene derivative, and the like.

A viscosity controlling agent refers to a component regulating viscosity of an electrode mixture in order to help processes for blending and applying the electrode mixture to a collector to be more easily performed. The viscosity controlling agent is preferably added in an amount of up to 30 wt. % relative to a total weight of the electrode mixture. Examples of such viscosity controlling agent may include carboxymethyl cellulose, polyvinylene fluoride, etc., although not duly limited thereto. Optionally, the foregoing solvents may also serve as a viscosity controlling agent.

The filler used herein is an additional component to inhibit expansion of an electrode and is not particularly limited so long as it comprises fibrous materials without causing chemical change of a battery. For example, the filler may be formed using olefin based polymer such as polyethylene, polypropylene, etc. or a fibrous material such as glass fiber, carbon fiber, etc.

A coupling agent is another additional component to increase adhesion between an electrode active material and a binder, characterized in having at least two functional groups, and may be used in an amount of up to 30 wt. % relative to a weight of the binder. An example of such coupling agent may be a material having at least two functional groups wherein one of the functional groups reacts with a hydroxyl or carboxyl group present on a surface of silicon, tin or graphite based active material to form a chemical bond while another functional group reacts with a polymer binder to form another chemical bond. A preferred example of the coupling agents may be a silane based coupling agent including: triethoxysilylpropyl tetrasulfide; mercaptopropyl triethoxysilane; aminopropyl triethoxysilane; chloropropyl triethoxysilane; vinyl triethoxysilane; methacryloxypropyl triethoxysilane; glycidoxypropyl triethoxysilane; isocyanatopropyl triethoxysilane; cyanatopropyl triethoxysilane, etc., although not particularly limited thereto.

An adhesion promoter used herein is an additional component to improve adhesion of an active material to a collector and may be added in an amount of not more than 10 wt. % relative to the binder. Examples of the adhesion promoter may include oxalic acid, adipic acid, formic acid, acrylic acid derivatives, itaconic acid derivatives, and the like.

A molecular weight controller may include, for example, t-dodecylmercaptan, n-dodecylmercaptan, n-octylmercaptan, etc. A cross-linking agent may include, for example, 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, tetraethyleneglycol dimethacrylate, divinylbenzene, and the like.

The collector of the electrode is a part in which electrons move during electrochemical reaction of the active material and, based on types of the electrode, may be classified into an anode collector and a cathode collector.

The anode collector is generally fabricated with a thickness of 3 to 500 μm. So long as the anode collector exhibits conductivity and does not cause chemical change of a battery, materials of the anode collector are not particularly restricted and may include, for example, copper, stainless steel, aluminum, nickel, titanium, calcined carbon, copper or stainless steel surface-treated with carbon, nickel, titanium, silver, etc., or aluminum-cadmium alloy, and so forth.

The cathode collector is generally fabricated with a thickness of 3 to 500 μm. So long as the cathode collector exhibits high conductivity and does not cause chemical change of a battery, materials of the cathode collector are not particularly restricted and may include, for example, stainless steel, aluminum, nickel, titanium, calcined carbon, or aluminum or stainless steel surface-treated with carbon, nickel, titanium, silver, etc.

The collector may form fine unevenness on a surface thereof in order to reinforce binding of an electrode active material and be utilized in different forms such as a film, a sheet, a foil, a net, a porous body, a foam, a non-woven fabric, and the like.

The lithium containing non-aqueous electrolyte used herein may comprise a non-aqueous electrolyte and a lithium salt.

The foregoing non-aqueous electrolyte may be an aprotic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethylsulfoxide; 1,3-dioxolane; formamide; dimethylformamide; dioxolane; acetonitrile; nitromethane; methyl formate; methyl acetate; phosphoric triester; trimethoxy methane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, etc.

The lithium salt used herein is a substance easily dissolved in the non-aqueous electrolyte and examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate, imides, etc.

Optionally, an organic solid electrolyte or an inorganic solid electrolyte may be used.

The organic solid electrolyte may include, for example, polyethylene derivatives, polyethylene oxide derivatives, polypropylene oxide derivatives, phosphoric ester polymer, poly agitation lysine, polyester sulfide, polyvinyl alcohol, polyvinylidene fluoride, and a polymer having ionic dissociation groups.

The inorganic solid electrolyte may include Li nitrides, halides, sulfates, etc., for example, $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

For improvement of charge-discharge features and/or flame retardancy, the non-aqueous electrolyte may further include, for example, pyridine, triethyl phosphite, triethanolamine, cyclic ether, ethylenediamine, n-glyme, hexaphosphoric triamide, a nitrobenzene derivative, sulfur, quinone imine dye, N-substituted oxazolidinone, N,N-substituted imidazolidine, ethyleneglycol dialkylether, ammonium salt, pyrrol, 2-methoxy ethanol, aluminum trichloride, etc. Optionally, the electrolyte may include a halogen solvent such as carbon tetrachloride, ethylene trifluoride, etc. to provide non-flammability and/or $CO_2$ gas to improve high temperature preservation of the electrolyte.

A lithium secondary battery of the present invention may be fabricated according to any conventional method known in related arts. As to the inventive lithium secondary battery, configurations of the cathode, anode and separator are not particularly restricted and, for example, each sheet may be placed in a circular, angular or pouch type case in a winding or stacking form.

The lithium secondary battery according to the present invention may be employed in various devices requiring excellent rate properties and high temperature stability, for example: a power tool driven by an electric motor; an electric automobile such as an electric vehicle (EV), hybrid electric vehicle (HEV), plug-in hybrid electric vehicle (PHEV), etc.; an electric two-wheel vehicle such as an E-bike, E-scooter, etc.; an electric golf cart, and so forth, without particular limitation.

Advantageous Effects

As described above, when a cathode active material of the present invention is introduced to a lithium secondary battery, high capacity of the battery may be sufficiently attained. In addition, by applying a conductive polymer to a surface of lithium nickel-manganese-cobalt oxide, high temperature stability may be favorably enhanced without deterioration in performance of the battery.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purpose only and do not restrict the scope of the present invention.

Example 1

After placing an active material: polypyrrole in a relative ratio by weight of 100:2 into a dry coating device, the mixture was treated at 2.5 kW and 3,000 rpm for 5 minutes. The active material was $LiNi_{0.53}Mn_{0.27}Co_{0.20}O_2$.

Example 2

The same procedure as described in Example 1 was repeated to treat the active material except that a relative weight ratio of $LiNi_{0.53}Mn_{0.27}CO_{0.20}O_2$: polypyrrole was 100:1.

Example 3

The same procedure as described in Example 1 was repeated to treat the active material except that a relative weight ratio of $LiNi_{0.5}Mn_{0.3}Co_{0.2}O_2$: polypyrrole was 100:2.

Comparative Example 1

The active material used in Example 1 was prepared without additional processing.

Experimental Example 1

Figure 1:
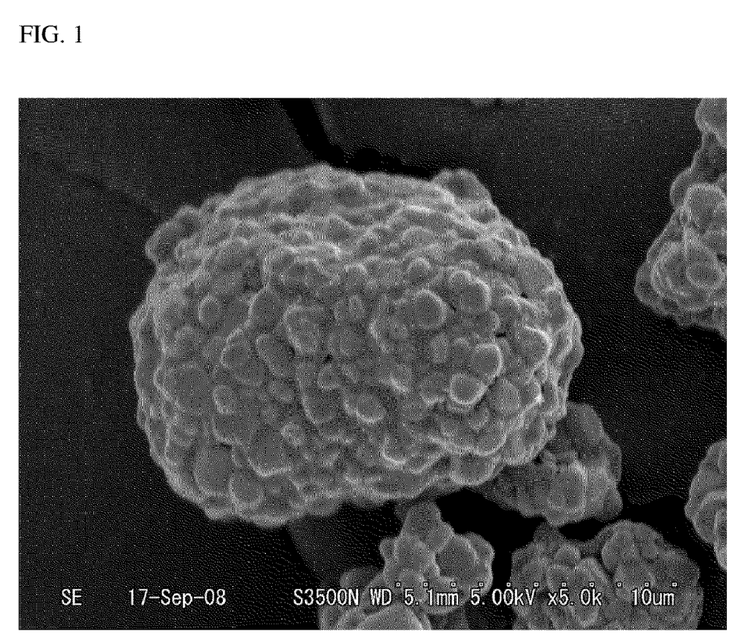
FIG. 1 is an SEM photograph showing a material obtained in Example 1 according to Experimental Example 1.
Figure 2:
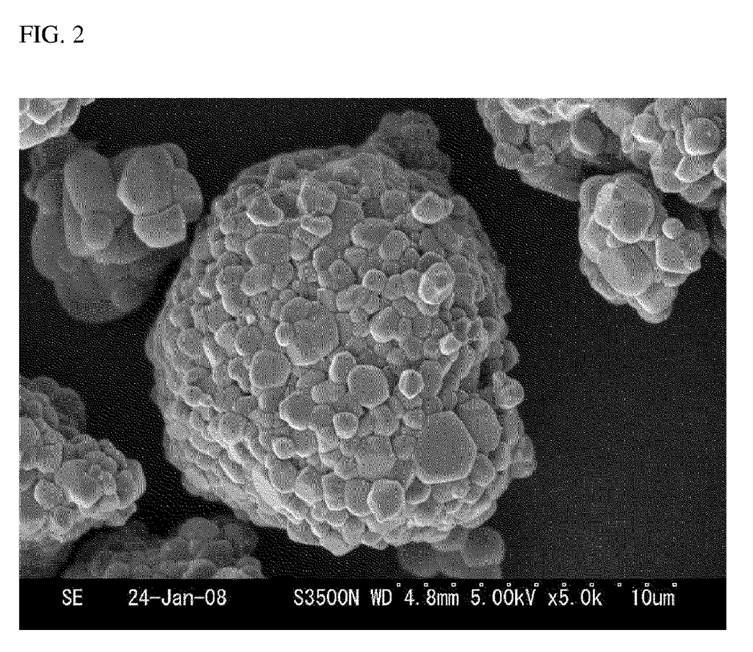
FIG. 2 is an SEM photograph showing a material obtained in Comparative Example 1 according to Experimental Example 1.

For each of the active materials obtained in Example 1 and Comparative Example 1, a surface of the active material was observed through SEM. Observed results of the materials of Example 1 and Comparative Example 1 are shown in FIGS. 1 and 2, respectively.

Experimental Example 2

Each of the active materials obtained in Examples 1 to 3 and Comparative Example 1 was formed into a slurry by blending the active material together with a conductive material and a binder in a relative weight ratio of 95:2.5:2.5, followed by applying the slurry to Al-foil so as to form an electrode. After punching the formed electrode to reach 25% porosity, a coin cell was fabricated using the punched electrode. An anode was Li and an electrolyte was 1M $LiPF_6$ dissolved in a carbonate solvent. The fabricated cell was subjected to charge-discharge treatment at 0.1C and 3 to 4.25V and, after monitoring capacity and cell efficiency, the results obtained for the materials of Examples 1 and 2 and Comparative Example 1 are shown in TABLE 1.

TABLE 1

|  | $1^{st}$ Charge (mAh/g) | $1^{st}$ Discharge (mAh/g) | $1^{st}$ Efficiency (%) |
| --- | --- | --- | --- |
| Comparative Example 1 | 184.3 | 162.1 | 87.9 |
| Example 1 | 184.5 | 161.9 | 87.8 |
| Example 2 | 184.3 | 162.2 | 88.0 |

As shown in TABLE 1, it was found that all of the active materials exhibit favorable electrochemical performance and the active material obtained in Example 3 shows substantially the same results.

Experimental Example 3

Figure 3:
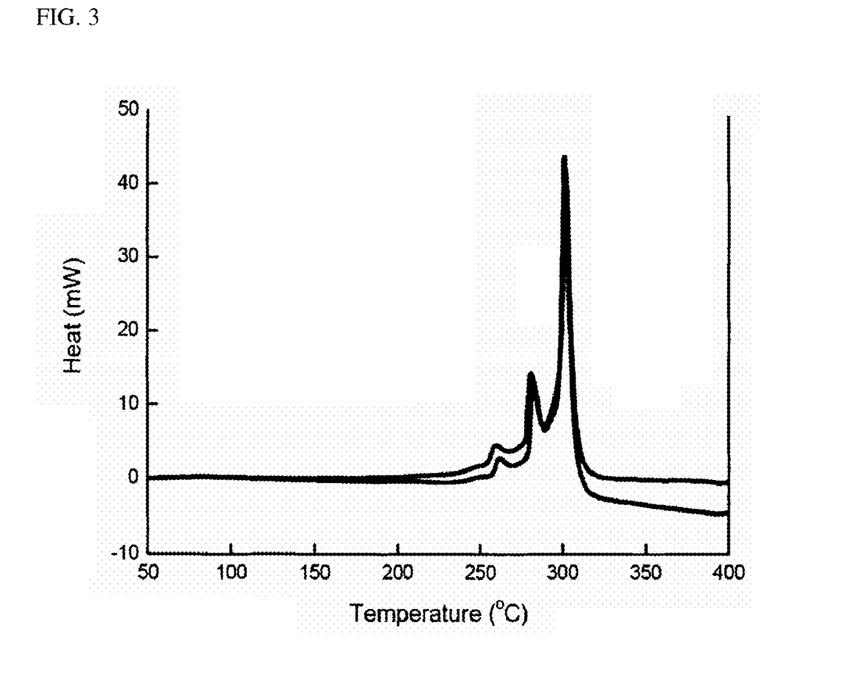
FIG. 3 illustrates a DSC graph of the material obtained in Comparative Example 1 according to Experimental Example 3.
Figure 4:
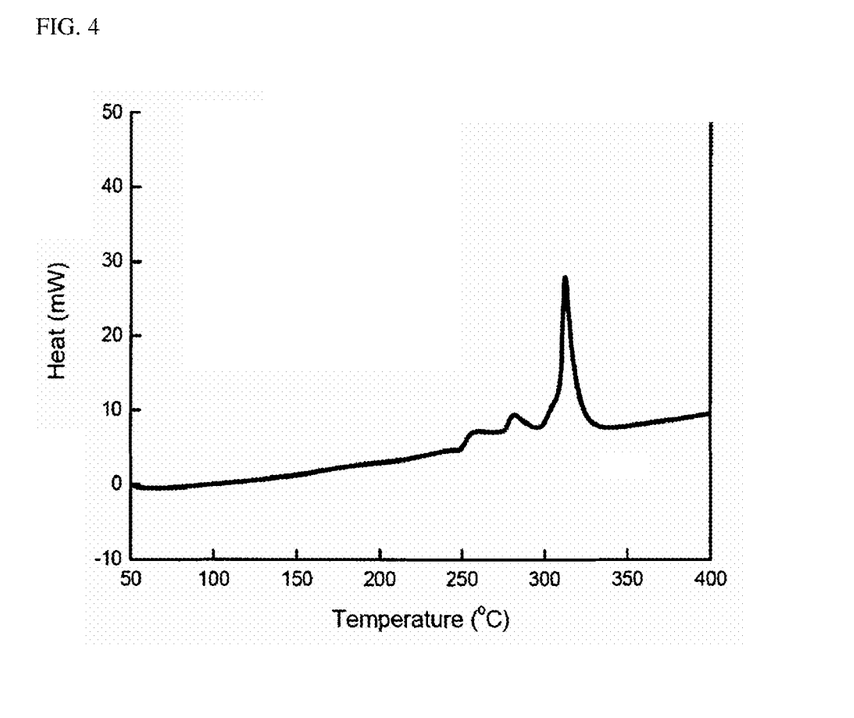
FIG. 4 illustrates a DSC graph of the material obtained in Example 1 according to Experimental Example 3.
Figure 5:
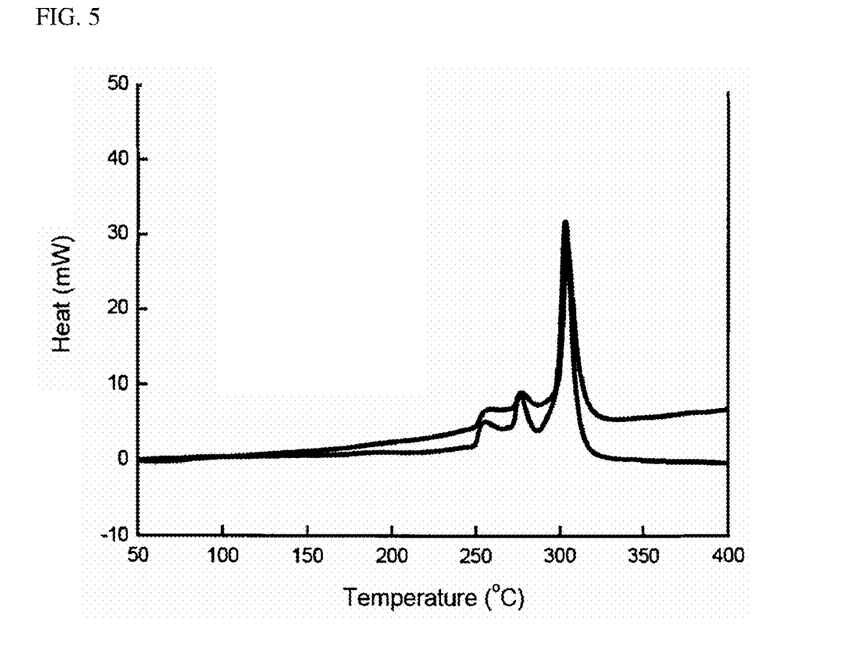
FIG. 5 illustrates a DSC graph of a material obtained in Example 2 according to Experimental Example 3.

After charging a cell fabricated using each of the active materials according to Experimental Example 2 to 4.3V at 0.1C, heating position and heating intensity were measured using a differential scanning calorimeter (DSC). Results of Comparative Example 1, Example 1 and 2 are shown in FIGS. 3, 4 and 5, respectively.

Compared to Comparative Example 1, it was found that both the active materials obtained in Examples 1 and 2 have drastically reduced heating intensity. In addition, it was observed that the heating intensity is further decreased when polypyrrole content in the active material is increased. Example 3 also showed substantially the same results as Example 1. Consequently, we determined that safety of the active material was preferably enhanced.

Experimental Example 4

Figure 6:
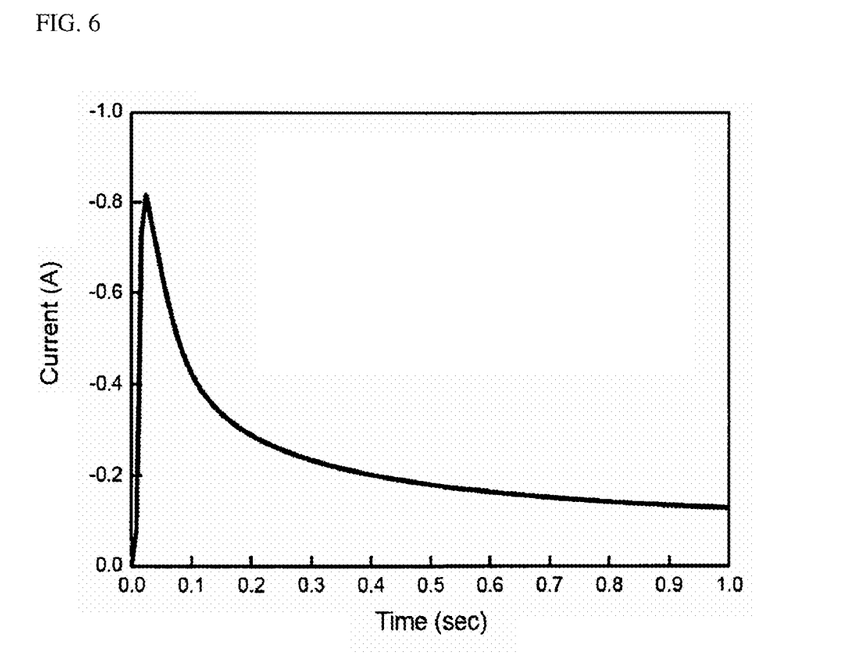
FIG. 6 illustrates an SCC graph of the material obtained in Comparative Example 1 according to Experimental Example 4.
Figure 7:
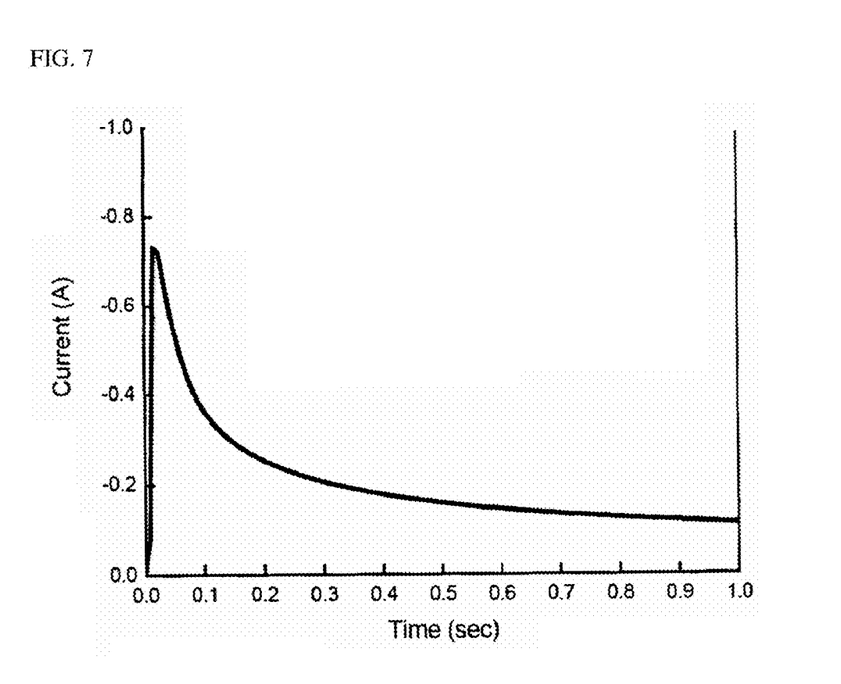
FIG. 7 illustrates an SCC graph of the material obtained in Example 1 according to Experimental Example 4.
Figure 8:
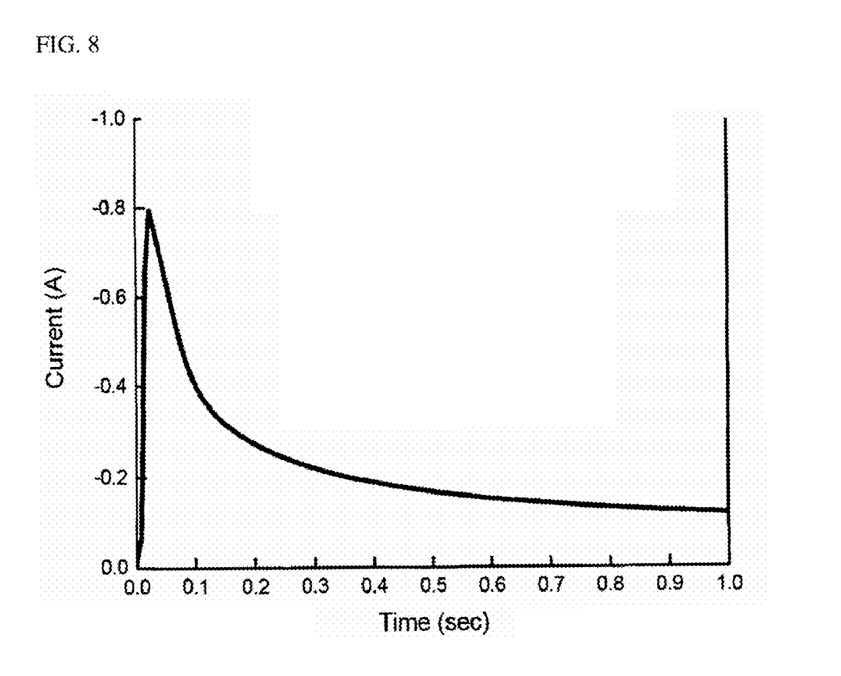
FIG. 8 illustrates an SCC graph of the material obtained in Example 2 according to Experimental Example 4.

For a cell fabricated using each of the active materials according to Experimental Example 2, short circuit current (SCC) was measured. FIGS. 6, 7 and 8 show results of Comparative Example 1, Examples 1 and 2, respectively.

Compared to Comparative Example 1, it was found that both the active materials obtained in Examples 1 and 2 exhibit reduced current peaks. Also, it was observed that, as content of polypyrrole in the active material are increased, a size of the current peak is further reduced. Likewise, Example 3 shows substantially the same results as Example 1. Therefore, we determined that safety of the active material was preferably enhanced.

Although the preferred embodiments of the present invention have been disclosed for illustrative purposes, those skilled in the art will appreciate that various applications and modifications are possible on the basis of the above detailed description, without departing from the scope and spirit of the invention as disclosed in the accompanying claims.

The invention claimed is:
1. A cathode active material, comprising:
cathode active material particles having an average particle diameter D50 of 3 to 20 μm, said cathode active material particles comprising an agglomerated structure of an aggregate of microfine particles which have an average particle diameter D90 of 0.01 to 8 μm, said microfine particles comprising a lithium nickel-manganese-cobalt oxide represented by Formula 1, wherein the lithium nickel-manganese-cobalt oxide has a nickel content of at least 40% among overall transition metals; and
polypyrrole coated on a surface of said cathode active material particles:

$$Li_xM_yO_2 \qquad (1)$$

wherein M is $Ni_{1-a-b}Mn_aCo_b$ ($0.05 \leqq a \leqq 0.4$, $0.1 \leqq b \leqq 0.4$, $0.4 \leqq (1-a-b) \leqq 0.9$), x+y is about 2 and $0.95 \leqq x \leqq 1.15$; and wherein a coating amount of polypyrrole coated on an exposed surface of the agglomeration of said cathode active material particles ranges from 0.5 to 10% by weight relative to a total weight of the active material; and a coating thickness ranges from 0.1 to 10 μm.

2. A cathode active material according to claim 1, wherein the polypyrrole has a melting point of 80 to 300° C.

3. A lithium secondary battery including the cathode active material as set forth in claim 1.

4. The lithium secondary battery according to claim 3, wherein the lithium secondary battery is used as a power supply for a power tool, an electric vehicle, an electric two-wheel vehicle and/or an electric golf cart.

5. The cathode active material according to claim 1, wherein the lithium nickel-manganese-cobalt oxide is $LiNi_{0.53}Mn_{0.27}Co_{0.2}O_2$.

6. The cathode active material according to claim 1, wherein the lithium nickel-manganese-cobalt oxide is $LiNi_{0.5}Mn_{0.3}Co_{0.2}O_2$.

7. A cathode active material composition comprising:
the cathode active material according to claim 1;
a conductive material; and
a binder.

* * * * *